(12) United States Patent
Meng

(10) Patent No.: US 10,317,946 B2
(45) Date of Patent: Jun. 11, 2019

(54) PORTABLE DESKTOP COMPUTER

(71) Applicants: BOE TECHNOLOGY GROUP CO., LTD., Beijing (CN); BEIJING BOE CHATANI ELECTRONICS CO., LTD., Beijing (CN)

(72) Inventor: Yingli Meng, Beijing (CN)

(73) Assignees: BOE TECHNOLOGY GROUP CO., LTD., Beijing (CN); BEIJING BOE CHANTANI ELECTRONICS CO., LTD., Beijing (CN)

( * ) Notice: Subject to any disclaimer, the term of this patent is extended or adjusted under 35 U.S.C. 154(b) by 21 days.

(21) Appl. No.: 14/743,857

(22) Filed: Jun. 18, 2015

(65) Prior Publication Data
US 2016/0224067 A1 Aug. 4, 2016

(30) Foreign Application Priority Data

Feb. 2, 2015 (CN) .................... 2015 2 0073393 U

(51) Int. Cl.
*G06F 1/16* (2006.01)
*G06F 1/20* (2006.01)

(52) U.S. Cl.
CPC .......... *G06F 1/1652* (2013.01); *G06F 1/1601* (2013.01); *G06F 1/1656* (2013.01); *G06F 1/203* (2013.01)

(58) Field of Classification Search
CPC ....... G06F 1/1652; G06F 1/203; G06F 1/1656
USPC .................................................... 361/679.26
See application file for complete search history.

(56) References Cited

U.S. PATENT DOCUMENTS

| 7,463,238 | B2 * | 12/2008 | Funkhouser | G06F 1/1601 345/107 |
| --- | --- | --- | --- | --- |
| 8,502,788 | B2 * | 8/2013 | Cho | G06F 1/1626 345/173 |
| 2004/0052037 | A1 * | 3/2004 | Sawyer | G06F 1/1601 361/679.05 |
| 2004/0061683 | A1 * | 4/2004 | Mochizuki | G06F 1/1601 345/168 |
| 2004/0183958 | A1 * | 9/2004 | Akiyama | G02F 1/133305 349/58 |
| 2005/0040962 | A1 * | 2/2005 | Funkhouser | G06F 1/1601 340/815.4 |
| 2008/0212271 | A1 * | 9/2008 | Misawa | G02F 1/133305 361/679.01 |
| 2010/0177020 | A1 * | 7/2010 | Bemelmans | G09F 9/00 345/55 |
| 2011/0227855 | A1 * | 9/2011 | Kim | G02F 1/13306 345/173 |

(Continued)

*Primary Examiner* — Rockshana D Chowdhury
(74) *Attorney, Agent, or Firm* — Womble Bond Dickinson (US) LLP

(57) ABSTRACT

The present application relates to the computer technical field, and discloses a portable desktop computer which is capable of solving the technical problem of inconvenient transportation and carrying of the desktop computer. The portable desktop computer comprises a columnar host and a flexible display; a columnar outer surface of the host is provided with a ring groove with which the flexible display is wound, and the host is provided with block pins used for blocking the flexible display within the ring groove. The portable desktop computer is featured with combining the host with the flexible display together for easily carrying and convenient transportation.

13 Claims, 4 Drawing Sheets

(56) References Cited

U.S. PATENT DOCUMENTS

2014/0362512 A1* 12/2014 Hinson ................ G06F 15/025
  361/679.21
2015/0029229 A1*  1/2015 Voutsas ................ G06F 1/1652
  345/661

* cited by examiner

PORTABLE DESKTOP COMPUTER

TECHNICAL FIELD

This application refers to a computer technical field and in particular refers to a portable desktop computer.

BACKGROUND

With increasingly develop of technology, electronic products have widely used in human's life; and the computer has become an essential electronic tool in people's daily life and is usually used in the form of a notebook computer and a desktop computer.

The notebook computer has the advantages of compact size, light weight and good portability. However, compared with the desktop computer at the same price level, the notebook computer has a much lower configuration and accordingly a smaller display screen than the desktop computer, and therefore the desktop computer still remains popular among consumers.

Although the desktop computer has the advantages of higher configuration, larger display screen and low price, the display and the host of the existing desktop computer are packed separately and thus are not convenient for transporting and carrying.

SUMMARY

Embodiments of the present application provide a portable desktop computer which is capable of solving the above technical problem of inconvenient transportation and carrying.

To this end, embodiments of the present application employ the following technical solution:

A portable desktop computer, comprising a columnar host and a flexible display; a columnar outer surface of the host is provided with a ring groove into which the flexible display can be wound, and the host is provided with one or more block pins used for blocking the flexible display within the ring groove, and where the blocking effect of the block pins is released, the flexible display is enabled to be switched between the wound state within the ring groove and the unfolded state.

For the purpose of simplifying the structure of the block pin, the block pin is a retractable projection which is provided at the edge position of two opposite ring surfaces of the ring groove.

For the purpose of preventing the flexible display from waggling within the ring groove, the width of the ring groove is substantially equal to the width of the flexible display. For the purpose of fully winding the flexible display into the holding cavity of the ring groove so as to avoid scratching the display, the minimum depth of the ring groove is not less than the thickness of the flexible display.

For the purpose of fully making use of the structural feature of the host and reducing the volume of the whole desktop computer, the host is provided with a hollow cavity; and the hollow cavity is provided with a heat sink which is integrated with a motherboard, a CPU, a sound card and a graphics card.

For the purpose of increasing heat-dissipation area, the heat sink is of a hollow prismatic structure.

For the purpose of further increasing heat-dissipation area, the heat sink is of a structure having multiple layers which nest within each other.

For the purpose of speeding up the air flow to facilitate heat-dissipation, a fan is provided above the heat sink.

For the purpose of allowing for data connections between the host and the flexible display, the host and the flexible display each are provided with video transmission interfaces such as VGA, DVI or HDMI, and the host and the flexible display are connected together through VGA, DVI or HDMI data lines.

In use of the flexible display, the portable desktop computer further comprises a frame for supporting the flexible display for the purpose of unfolding the display screen to such an extent that the viewing angle is increased, wherein the frame is a rod-shaped structure of a curved arc or simply a straight rod.

In use of the flexible display, the portable display further comprises a base for supporting the flexible display and the base is provided with an angle adjusting means for adjusting the pitch angle of the flexible display and a height adjusting means for adjusting the height of the flexible display, for the purpose of easily adjusting the pitch angle and height of the flexible display.

For the purpose of reducing machining difficulties and cost, the columnar outer surface of the host is designed as a cylindrical surface or a polygonal prismatic surface.

Particularly, one end of the flexible display remains connecting with the host to accomplish stability of the flexible display unfolded and the signal transmission with the host.

Particularly, the display face of the flexible display faces inwards or outwards when the display is wound.

Particularly, an interface panel for the host is provided at the bottom of the ring groove of the host.

Particularly, the flexible display screen of the flexible display is carried on a metal sheet which can be curved.

The portable desktop computer from embodiments of the present application comprises a host and a display; the host is designed as a columnar structure and the columnar outer surface thereof is provided with a ring groove; the display is designed as a flexible display and the flexible display may be wound into the ring groove; the host and the flexible display can be combined together by blocking the flexible display into the ring groove via the block pins, resulting in very convenient carrying and transportation.

BRIEF DESCRIPTION OF THE DRAWINGS

In figures, like reference numerals designate like parts throughout the drawings. The drawings are not necessarily drawn to scale; rather the emphasis is placed on the illustration of the principle of the present invention.

REFERENCE NUMBERS 1 host; 2 display;
101 ring groove; 102 projection; 103 air inlet; 104 air outlet;
105 data line interface for the host; 106 fan; 107 heat sink; 108 cellular heat sink;
109 one-piece heat sink;
201 frame; 202 base; 203 data line interface for the display
204 pitch angle adjusting arm; 205 height adjusting arm.

DETAILED DESCRIPTION

In the following description, the portable desktop computer of embodiments of the present application will be described in detail with reference to the drawings.

Figure 1:
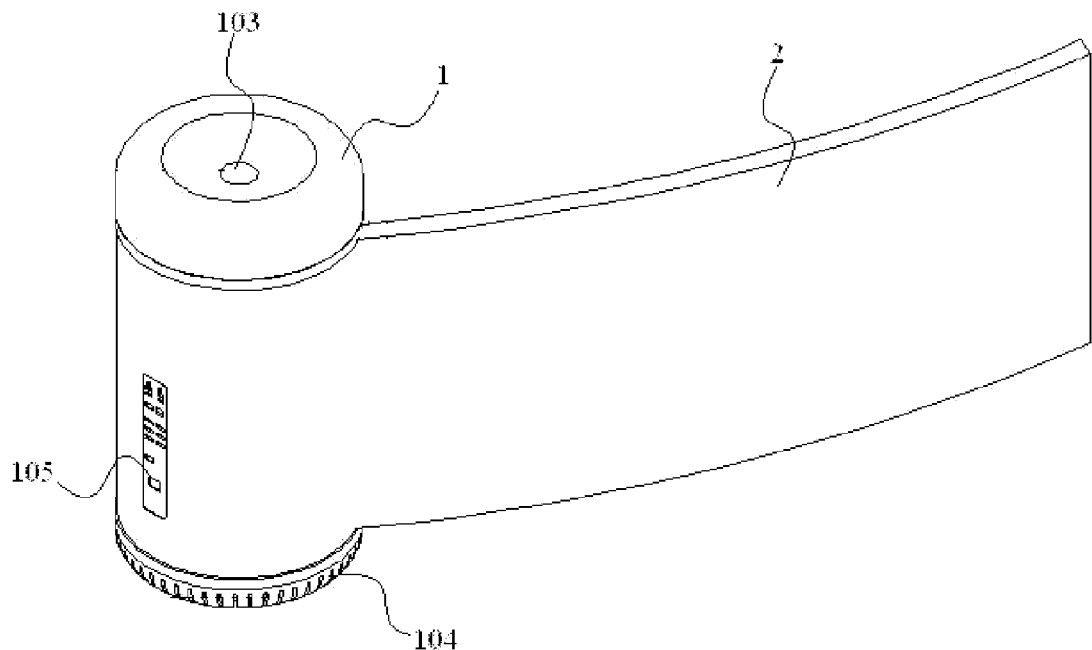
FIG. 1 is a perspective view of the portable desktop computer in which the flexible display is unfolded according to embodiments of the present application.
Figure 2:
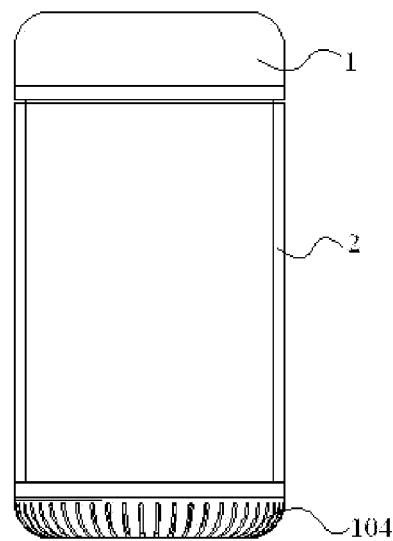
FIG. 2 is a front view of the portable desktop computer in which the flexible display is wound into the ring groove of the host according to embodiments of the present application.

A portable desktop computer, as shown in FIG. 1 and FIG. 2, comprises a columnar host 1 and a flexible display 2. The columnar outer surface of the host 1 is provided with a ring groove 101 into which the flexible display 2 can be wound, and block pins are provided between the host 1 and the flexible display 2 for blocking the flexible display 2 into the ring groove 101.

In the present embodiment, since the host 1 is disposed as a columnar structure the columnar outer surface of which is provided with the ring groove 101, and the display 2 is disposed as a flexible structure which can be curved, e.g., the flexible display screen is carried on a flexible metal sheet (which, for example, could be a metal sheet which can be curved and have the shape-memory effect), the flexible display 2 can be wound into the ring groove 101 and blocked within the ring groove 101 via the block pins, thereby integrating the host 1 with the flexible display 2 for convenient carrying and transportation.

In use of the portable desktop computer, as shown in FIG. 1, where the blocking effect of the block pins to the flexible display 2 is released, the flexible display 2 is gradually unfolded from the ring groove 101. After being unfolded, one end of the flexible display 2 can be blocked via the block pins and remained connected with the host. Since the flexible substrate of the flexible display 2 is a metal sheet which can be curved, the unfolding extent of the flexible display 2 can be adjusted, and when the display 2 is adjusted for a proper viewing angle, the display 2 can be supported by a frame or other means for positioning it and then be operated. This has the advantages of wide viewing angle, simple structure and easy use. Furthermore, in this operating state, the flexible display 2 may be directly fixed at the host 1 without any means for supporting and fastening the flexible display 2 (e.g., the base for the display), thereby not only saving material and reducing cost, but also saving space and time for installing the display, and thus it is very easy to use the desktop computer since only the data connection between the host 1 and the flexible display 2 and power supply are needed. The flexible display 2 can be powered by external power supply lines or the host.

Figure 7:
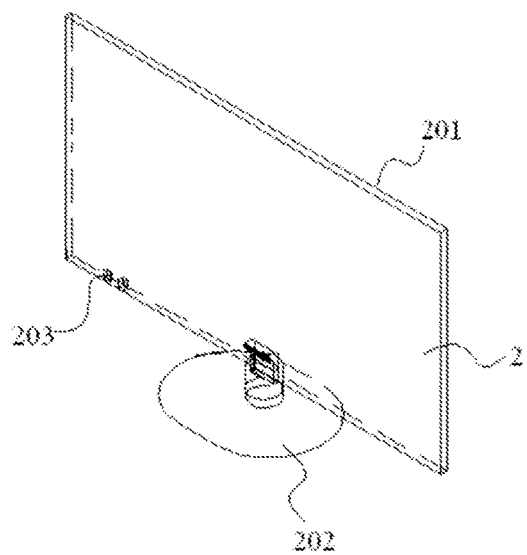
FIG. 7 is a perspective structure schematic view of the flexible display installed on the base and supported by the frame according to embodiments of the present application.

As shown in FIG. 1, when the flexible display 2 is unfolded for use, it can be remained connected with the host at its one end by which the power supply and signal transmission between the flexible display 2 and the host 1 can be attained, so that the step of providing additional connection to the flexible display 2 can be omitted. As another example, as shown in FIG. 7, in operation, the flexible display 2 can be disposed separately from the host 1, which would have higher flexibility to use.

Figure 3:
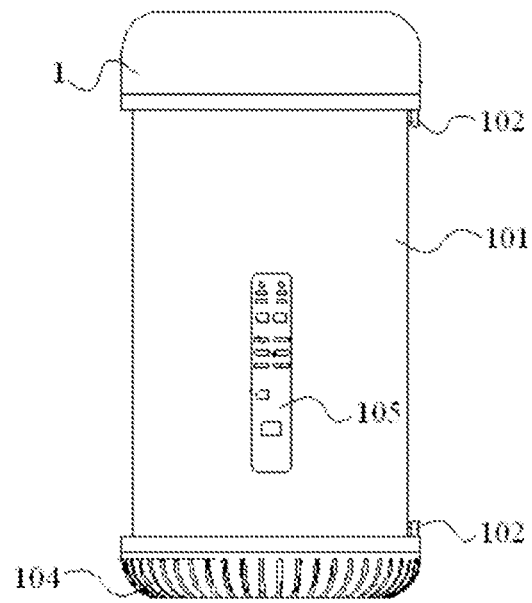
FIG. 3 is a front view of the host shown in FIG. 1 or FIG. 2.

Moreover, as shown in FIGS. 1 and 3, after the flexible display is unfolded, it can be seen that a data line interface panel 105 for the host is provided at the bottom of the ring groove of the host 1 (i.e., the columnar surface of the host). In the panel, various interfaces are provided for the connection of the portable desktop computer with various periphery devices.

When the portable desktop computer is not in use or is required to be moved to other relatively remote locations, as shown in FIG. 2, the flexible display 2 is merely needed to be rolled and wound within the ring groove 101 and then blocked via the block pins. At this time, the host 1 and the flexible display 2 are secured together and thus the whole desktop computer merely occupies the same space as that the host 1 alone occupies, so that the desktop computer can be packed as a whole, thereby saving the material and time for packing and resulting in easy carrying and transportation.

Figure 6:
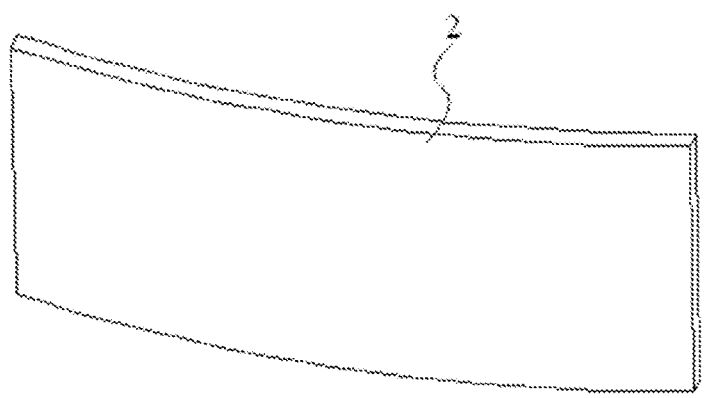
FIG. 6 is a structure schematic view of the flexible display according to embodiments of the present application.

In the present embodiment, as shown in FIGS. 3 and 6, the block pin is a retractable projection 102 for the purpose of simplifying the structure of the block pin. The projection 102 is provided at the edge position of two opposite ring surfaces of the ring groove 101, e.g., the edge positions of the upper and lower ring surfaces of the ring groove 101 as shown in the drawings. The retracting of the projection 102 can be realized by providing an elastic means such as a spring between the projection 102 and the host. When the flexible display 2 needs to be rolled and wound into the ring groove 101, the projection 102 is firstly pressed to release the blocking effect of the projection 102; and after the flexible display 2 has already been rolled and wound into the ring groove 101, the projection 102 is rebounded by means of the action of the elastic means so that the flexible display 2 is limited in the space between the projection 102 and the periphery of the ring groove 101. In addition, the block pin can be designed as other structures capable of blocking the flexible display 2, such as rotary knob or roll-over block pin, omitting detailed descriptions thereof. For the purpose of enhancing the stability of the flexible display in the ring groove, a plurality of block pins can be evenly provided at the periphery of the ring groove.

For the purpose of preventing the flexible display 2 from waggling within the ring groove 101, the width of the ring groove 101 is substantially equal to the width of the flexible display 2, and after being wound, the upper and lower sides of the flexible display 2 are just abutted against the upper and lower ring surfaces of the ring groove 101.

When the flexible display 2 is wound into the ring groove 101, the minimum depth of the ring groove 101 is not less than the thickness of the flexible display 2 in order for fitting both well and pretty appearance. At this time, the flexible display 2 can be received as a whole in the holding space of the ring groove 101 so that the surface of the display screen will be not easily scratched during transportation and carrying. Of course, the flexible display 2 can be wound precisely one round within the ring groove 101 so that it will not overlap itself during winding, so that there will not be any depression, thereby not only maintaining the display quality of the flexible display 2, but also maintaining the pretty appearance after it is wound. It is to be understood that the minimum depth of the ring groove 101 can be larger than the thickness of the flexible display 2 so that the flexible display 2 can be wound more than one round, so that further reduces the diameter of the host 1 and its volume and weight, for facilitating transportation and carrying.

Because the Organic Light-Emitting Diode (OLED) is thin, it can be installed on the flexible material such as plastic or shape-memory metal sheet to form the flexible screen. Compared to the traditional screen, the flexible screen is lighter and thinner, capable of being curved and folded and consuming less power. Accordingly, for the purpose of thinning the display, increasing the view angle and saving electricity, the flexible OLED display screen of the flexible display 2 is carried on the metal sheet.

Figure 4:
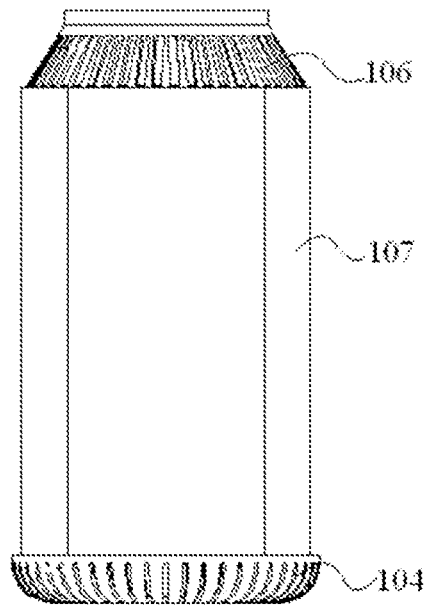
FIG. 4 is a front view of the heat sink in the portable desktop computer according to embodiments of the present application.

In the present embodiment, as shown in FIG. 4, for the purpose of fully making use of the structural feature of the host 1 and reducing the volume of the whole desktop computer, the host 1 is provided with a hollow cavity; and the hollow cavity is provided with a heat sink 107 which is integrated with a motherboard, a CPU, a sound card and a graphics card. Of course, it is well known in the art that the CPU, the sound card and the graphics card can be directly integrated into the motherboard. As shown in FIGS. 1 to 4, an air inlet 103 can be provided above the hollow cavity of the host 1 shown in the figure and an air outlet 104 can be provided below the hollow cavity.

Figure 5:
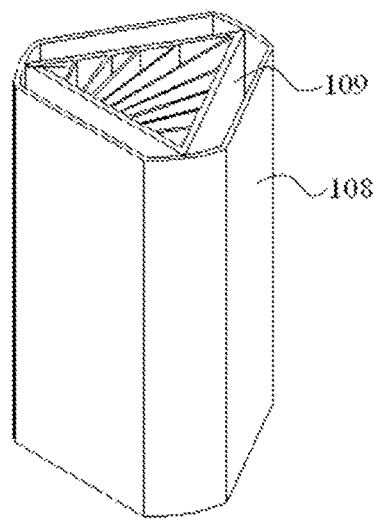
FIG. 5 is a perspective structure schematic view of the heat sink in the portable desktop computer according to embodiments of the present application.

Moreover, for the purpose of increasing heat-dissipation area, as shown in FIG. 5, the heat sink 107 can be disposed as a hollow polygonal prismatic structure. Alternatively, the heat sink 107 can be disposed as a structure having multiple layers which nest each other. For example, the heat sink 107 is disposed as an inner layer of heat sink and a outer layer of heat sink, wherein the inner layer is a one-piece heat sink 109 and the outer layer is a cellular heat sink 108 (the cellular shape is not shown in the drawing). The one-piece heat sink 109 is provided with a motherboard, a CPU, a sound card and a graphics card etc. Particularly, components such as the motherboard etc can be embedded between the heat sinks.

In the present embodiment, as shown in FIG. 4, for the purpose of further increasing heat-dissipation effect of the heat sink 107, a fan 106 is provided above the heat sink which speeds up the air flow and in turn improving heat-dissipation.

In the present embodiment, for the purpose of allowing for data connections between the host 1 and the flexible display 2, the host 1 and the flexible display 2 each are provided with Video Graphics Array (VGA) interfaces, such as data line interfaces 105 for the host (as shown in FIGS. 1 and 3), data line interfaces for the display 203 (as shown in FIG. 7). The host 1 and the flexible display 2 are connected via VGA data lines for data transmission. Apparently, the VGA interfaces can be replaced with DVI or HDMI interfaces. In addition, power line can be provided between the host 1 and the flexible display 2 for powering the flexible display 2 through the host 1.

In the present embodiment, in use of the flexible display 2, a frame 201 of a certain shape can be used for supporting the flexible display for the purpose of unfolding the display screen to such an extent that the viewing angle is increased. For example, the frame 201 is disposed as a rod-shaped structure of a curved radian with which the upper and lower sides of the flexible display 2 are supported so that the flexible screen displays at a radian defined by the frame 201 to meet various display demands at different viewing angles. In addition, the frame 201 can be simply disposed as a straight rod, that is, the radian is zero, and therefore the flexible display screen is a plane display having the same displaying effect as the existing display screens.

Figure 8:
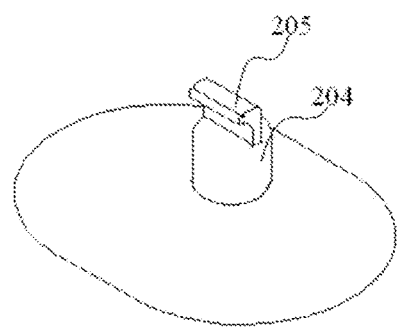
FIG. 8 is a perspective structure schematic view of the base shown in FIG. 7.

In the present embodiment, in use of the flexible display 2, a base 202 can be provided for supporting the flexible display 2 in order to enhance the applicability of the portable desktop computer. As shown in FIGS. 7 and 8, the base 202 is provided with an angle adjusting arm 204 for adjusting the pitch angle of the flexible display 2 (the angle adjusting means) and a height adjusting arm 205 for adjusting the height of the flexible display 2 (the height adjusting means). With such arrangement, the flexible display 2 can be placed separately from the host 1 during its operation, the applicability of which is enhanced significantly. In addition, the pitch angle and height of the flexible display 2 can be adjusted as demanded.

Particularly, the angle adjusting arm 204 spherically matches the base 202 so as to be adjustable at various azimuths. The height adjusting arm 205 is connected with the angle adjusting arm 204 and can be moved up and down along the angle adjusting arm 204 to achieve height adjusting. The specific structures and connections of the two adjusting arms are similar to those in the existing desktop computers and thereby the detailed descriptions are omitted herein.

In the present embodiment, as shown FIGS. 1 and 2, for the purpose of reducing machining difficulties and cost, the columnar outer surface of the host can be instead designed as a cylindrical surface or other shapes, such as triangular prism, quadrilateral prism, pentagonal prism and hexagonal prism. Where the columnar outer surface of the host 1 is of polygonal prism, the ridges of the polygonal prism should be rounded so that the prismatic surface which contacts directly the flexible display 2 smoothly transits to prevent the ridges of the prism from grinding and scratching the display screen unnecessarily when the flexible display 2 is wound into the ring groove 101 of the host 1.

In the present embodiment, in addition to the above advantages, a columnar lamp can be achieved after winding the flexible display 2 into the ring groove 101 of the host 1. At this time, the display face of the flexible display 2 should face outwards. When a power line is connected to the flexible display 2 and the flexible display 2 is turned on, the lighting effect can be achieved. This further enhances the functionality of the flexible display.

In sum, the flexible display 2 is wound into the ring groove 101 of the host 1 so that the desktop computer has the advantages of easily carrying and convenient transportation. And the flexible display 2 can be supported by the frame 201 of a certain arc so that the viewing angle range of the flexible display 2 can be increased. It also can be used as a lamp where the flexible display 2 is wound into the ring groove 101 with its display face facing outwards. Accordingly, the desktop computer of such structure can not only improve the portability but also its functionalities.

In the description of the present application, it is understood that the terms used for indicating the locations or directions, such as "upper", "lower", "inner" and "outer" and so on are based on the orientations or locations shown in the drawings, only for the purpose of facilitating and simplifying the description of the application, rather than indicating or implying that the devices or elements in question have to have specific originations or be operated and constructed in specific originations, which thus cannot be construed to limit the present application.

In the description of the present application, the specific features, structures, materials or characteristics may be combined in any suitable manner in any of one or more embodiments or examples.

The above contents are only specific embodiments of the present application, but the protection scope of the present application is not restricted to these specific embodiments described herein. It will be apparent to those skilled in the art that numerous modifications or substitutions can be envisaged from the scope disclosed by the application, which should all be within the protection scope of the present application. Accordingly, it is the claims that define the protection scope of the present application. In the claims, the word "comprise" does not exclude the presence of other elements or steps and the indefinite article "a" or "an" does not exclude a plurality. The mere fact that certain measures are recited in mutually different dependent claims does not indicate that the combination of these measures cannot be used to advantage.

The invention claimed is:

1. A portable desktop computer, comprising:
   a columnar host; and
   a flexible display;
   wherein a ring groove, into which the flexible display is wound and from which said flexible display is unfolded, is provided on a columnar outer surface of the columnar host; and the columnar host is provided with one or more block pins used for blocking the flexible display when wound within the ring groove, and
   the flexible display is enabled to be switched between the wound state within the ring groove and the unfolded state only under the condition that the blocking effect of the one or more block pins are released; and
   wherein the one or more block pins are retractable projections which are provided at edge positions of two opposite ring surfaces of the ring groove; and
   wherein a width of the ring groove is substantially equal to a width of the flexible display, and a minimum depth of the ring groove is greater than a thickness of the flexible display; and
   wherein the columnar host is provided with a hollow cavity; and the hollow cavity is provided with a heat sink; and
   wherein an air inlet is provided above the hollow cavity of the columnar host and an air outlet is provided below the hollow cavity; and
   wherein an interface panel for the columnar host is provided at a bottom of the ring groove of the columnar host.

2. The portable desktop computer of claim 1, wherein the columnar host is provided with a hollow cavity; and the hollow cavity is provided with a heat sink.

3. The portable desktop computer of claim 2, wherein the heat sink is of a hollow polygonal prismatic structure.

4. The portable desktop computer of claim 3, wherein the heat sink is of a structure having multiple layers which nest each other.

5. The portable desktop computer of claim 2, wherein a fan is provided above the heat sink.

6. The portable desktop computer of claim 1, wherein the columnar host and the flexible display each are provided with video transmission interfaces.

7. The portable desktop computer of claim 1, further comprising a frame for supporting the flexible display, wherein the frame is a rod-shaped structure of a curved arc or a straight rod.

8. The portable desktop computer of claim 7, further comprising a base for supporting the flexible display, and the base is provided with an angle adjusting means for adjusting the pitch angle of the flexible display and a height adjusting means for adjusting the height of the flexible display.

9. The portable desktop computer of claim 1, wherein the columnar outer surface of the columnar host is a cylindrical surface or a polygonal prismatic surface.

10. The portable desktop computer of claim 1, wherein one end of the flexible display remains connecting with the columnar host to accomplish the stability of the flexible display unfolded and the signal transmission with the host.

11. The portable desktop computer of claim 1, wherein the display face of the flexible display faces inwards when the display is wound.

12. The portable desktop computer of claim 1, wherein the display face of the flexible display faces outwards when the display is wound.

13. The portable desktop computer of claim 1, wherein the flexible display screen of the flexible display is carried on a metal sheet which is curved.

* * * * *